United States Patent
Svensson et al.

(10) Patent No.: US 12,398,770 B2
(45) Date of Patent: Aug. 26, 2025

(54) BRAKE PAD RETAINER ARRANGEMENT

(71) Applicant: Volvo Truck Corporation, Gothenburg (SE)

(72) Inventors: Lars Svensson, Gothenburg (SE); Kent Augustsson, Bollebygd (SE); Martin Petersson, Sävedalen (SE); Marcel Palmgren, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 479 days.

(21) Appl. No.: 17/637,506

(22) PCT Filed: Sep. 2, 2019

(86) PCT No.: PCT/EP2019/073361
§ 371 (c)(1),
(2) Date: Feb. 23, 2022

(87) PCT Pub. No.: WO2021/043384
PCT Pub. Date: Mar. 11, 2021

(65) Prior Publication Data
US 2022/0290727 A1    Sep. 15, 2022

(51) Int. Cl.
*F16D 65/097*    (2006.01)
*F16D 127/02*    (2012.01)

(52) U.S. Cl.
CPC ...... *F16D 65/0978* (2013.01); *F16D 2127/02* (2013.01)

(58) Field of Classification Search
CPC .... F16D 55/226; F16D 65/092; F16D 65/097; F16D 65/0978; F16D 2127/02; F16D 2055/007; F16D 2250/0084
See application file for complete search history.

(56) References Cited

U.S. PATENT DOCUMENTS

| | | | |
|---|---|---|---|
| 4,860,865 A * | 8/1989 | Montalvo, III | F16D 25/0635 188/71.3 |
| 6,357,559 B1 * | 3/2002 | Madzgalla | F16D 65/0975 188/73.32 |

(Continued)

FOREIGN PATENT DOCUMENTS

| | | | |
|---|---|---|---|
| AU | 2016335294 A1 * | 4/2018 | ............ F16D 55/00 |
| CN | 107923458 A | 4/2018 | |

(Continued)

OTHER PUBLICATIONS

Intention to Grant for European Patent Application No. 19762380.4, mailed Jul. 31, 2023, 21 pages.

(Continued)

*Primary Examiner* — Vishal R Sahni
(74) *Attorney, Agent, or Firm* — Withrow & Terranova PLLC

(57) ABSTRACT

A brake pad retainer arrangement for holding a brake pad in position relative to a disc in a disc brake. The arrangement comprises an elongated retainer bracket arranged to extend transversely over the disc and the brake pad, wherein the retainer bracket is spring loaded to press against a rim portion of the brake pad. The retainer bracket is also arranged to engage the rim portion at an angle, thereby biasing the brake pad in a direction away from the disc.

9 Claims, 3 Drawing Sheets

(56) References Cited

U.S. PATENT DOCUMENTS

| | | | |
|---|---|---|---|
| 7,458,447 B2 * | 12/2008 | Thomas | F16D 65/0977 188/73.38 |
| 2004/0118642 A1 | 6/2004 | Hulten et al. | |
| 2005/0284710 A1 * | 12/2005 | Roberts | F16D 55/36 188/73.31 |
| 2016/0273600 A1 * | 9/2016 | Radhakrishnan | F16D 65/092 |
| 2017/0138426 A1 * | 5/2017 | Schoenauer | F16D 65/0978 |
| 2018/0017123 A1 | 1/2018 | Elstorpff et al. | |
| 2019/0056000 A1 * | 2/2019 | Beyer | F16D 65/0973 |

FOREIGN PATENT DOCUMENTS

| | | | | |
|---|---|---|---|---|
| CN | 108087454 A | | 5/2018 | |
| DE | 19849309 A1 * | | 4/2000 | F16D 55/224 |
| DE | 19935036 C1 * | | 2/2001 | F16D 55/2265 |
| DE | 202008013446 U1 * | | 5/2009 | F16D 65/0976 |
| DE | 102014107227 A1 | | 9/2015 | |
| DE | 102015118838 A1 * | | 5/2017 | F16D 65/097 |
| DE | 102016100964 A1 * | | 7/2017 | |
| DE | 102022130944 A1 * | | 12/2023 | |
| EP | 1067304 A2 * | | 1/2000 | F16D 55/224 |
| EP | 1767805 A2 * | | 3/2007 | F16D 65/0974 |
| EP | 2184506 A1 * | | 5/2010 | F16D 65/0978 |
| EP | 2126397 B1 * | | 3/2012 | F16D 65/0975 |
| ES | 2737455 A1 * | | 1/2020 | F16D 55/226 |
| GB | 1425269 A * | | 2/1976 | F16D 65/0977 |
| JP | H0684032 U | | 12/1994 | |
| JP | H08177898 A | | 7/1996 | |
| WO | WO-02086344 A1 * | | 10/2002 | F16D 65/0006 |
| WO | WO-2017013001 A1 * | | 1/2017 | F16D 55/225 |
| WO | WO-2017198467 A1 * | | 11/2017 | F16D 55/226 |
| WO | 2018192627 A1 | | 10/2018 | |
| WO | WO-2019068619 A1 * | | 4/2019 | |
| WO | WO-2021043384 A1 * | | 3/2021 | F16D 55/2255 |

OTHER PUBLICATIONS

International Search Report and Written Opinion for International Patent Application No. PCT/EP2019/073361, mailed Apr. 29, 2020, 14 pages.

International Preliminary Report on Patentability for International Patent Application No. PCT/EP2019/073361, mailed Sep. 28, 2020, 10 pages.

First Office Action for Chinese Patent Application No. 201980099764.1, mailed Jan. 11, 2024, 13 pages.

* cited by examiner

BRAKE PAD RETAINER ARRANGEMENT

TECHNICAL FIELD

The invention relates to a brake pad retainer arrangement for holding a brake pad in position relative to a disc in a disc brake.

The invention can be applied in heavy-duty vehicles, such as trucks, buses and construction equipment.

BACKGROUND

A disc brake is a type of brake that uses calipers to squeeze pairs of brake pads against a disc or rotor to create friction. This action slows the rotation of a shaft, such as a vehicle axle, either to reduce its rotational speed or to hold it stationary.

It is important to secure the brake pads in the disc brake housing in a robust manner which allows for convenient assembly and servicing of the disc brake.

WO 2018/192627 A1 discloses a hold-down arrangement for securing brake pads in a disc brake.

When the disc brake is not engaged, the brake pads should be distanced from the disc. Contact between brake pad and disc when the brake is not in use generates parasitic drag, which is not desirable.

SUMMARY

It is an object of the present disclosure to provide improved disc brakes associated with reduced parasitic drag. This object is obtained by a brake pad retainer arrangement for holding a brake pad in position relative to a disc in a disc brake. The arrangement comprises an elongated retainer bracket arranged to extend transversely over the disc and the brake pad. The retainer bracket is spring loaded to press against a rim portion of the brake pad. The retainer bracket is arranged to engage the rim portion at an angle, thereby biasing the brake pad in a direction away from the disc.

The brake pad retainer arrangement keeps the brake pad away from the disc when the brake is not engaged, thereby reducing or eliminating parasitic drag. The brake pad retainer arrangement also provides vibration damping due to the spring loading, and reduces brake off rattle by configuring a spring force on the retainer instead of using a loose spring between brake pad and retainer. The brake pad retainer also acts as a shield to prevent damage to the brake from mechanical impact, e.g., during wheel removal.

According to aspects, the angle is between 5-15 degrees, and preferably about 10 degrees measured with respect to a horizontal plane perpendicular to the direction of the spring loading force. The disclosed angle ranges provide suitable biasing forces to keep the pad away from the disc when the brake is not engaged.

According to aspects, the retainer bracket comprises a tapered surface portion configured to engage the rim portion. This tapered surface portion improves the biasing effect to keep the pad away from the disc when the brake is not engaged.

According to aspects, a helical spring is arranged to load the retainer bracket to press against the rim portion of the brake pad. The helical spring provides a robust spring loading force which is maintained when subjected to vibration and mechanical stress.

According to aspects, the helical spring rests against a housing of the disc brake and is held in position by a fastener extending through one end of the retainer bracket and into a disc brake housing. The fastener can be used to adjust the spring loading force, e.g., during servicing, which is an advantage. The helical spring also absorbs vibration in the disc brake housing, which is an advantage.

According to aspects, the retainer bracket is pivotably attached at one end of the bracket to the disc brake housing. This means that the bracket can easily be lifted in order to access the brake pad and other internal disc brake components.

According to aspects, a middle portion of the elongated retainer bracket is formed to protrude from the disc brake to shield the disc brake from mechanical impact. The protruding portion provides an increased shielding capability, which is an advantage. Heavy objects, such as a wheel rim, may fall onto the disc brake without damaging the disc brake since the impact is absorbed by the protruding middle portion.

There is also disclosed herein disc brakes, vehicles, and brake pads associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
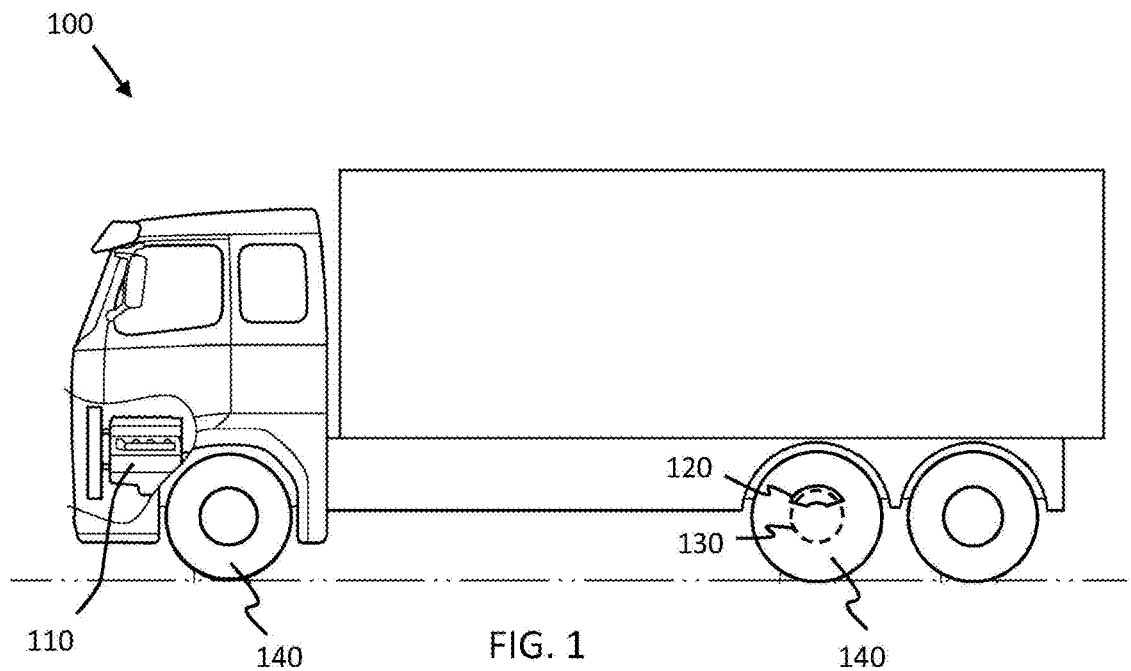
FIG. 1 schematically illustrates a vehicle.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 schematically illustrates a vehicle 100. The vehicle is powered by a motor 110. To brake the vehicle, or maintain the vehicle in a fixed parked position, a disc brake 120 is arranged in connection to wheels 140 of the vehicle. The disc brake 120 uses calipers to squeeze pairs of brake pads against a disc 130 to create friction. Disc brakes may be based on a single piston or on dual pistons, the techniques disclosed herein are not limited to any particular type of disc brake.

Disc brakes are known in general and will therefore not be discussed in more detail herein.

A problem with disc brakes is when the brake pads remain in contact with the disc 130 when the disc brake is not engaged or otherwise in use, i.e., when no braking action is desired. In this case the brake pad generates unwanted friction, often referred to as parasitic drag. This unwanted friction increases brake pad wear, leads to increased temperatures, and also contributes to decreased vehicle energy efficiency, i.e., an increased fuel/energy consumption.

Some known solutions for holding brake pads in position with respect to the brake disc 130 comprise loose sheet metal springs, often leaf springs, which are used to dampen brake pad vibration and to secure that the pad is positioned in the bottom of the brake pad carrier. This arrangement is not always effective; the pullback force which is supposed to retract the brake pad from the disc 130 when the brake is not in use can get stuck and cause increased friction. In some cases, vibrations are experienced due to the brake pad not retracting sufficiently. The leaf spring is often assembled on top of the pad, to keep the pad in position in the carrier abutment, which makes it sensitive to impacts from, e.g., the wheel rim during wheel servicing.

Figure 2:
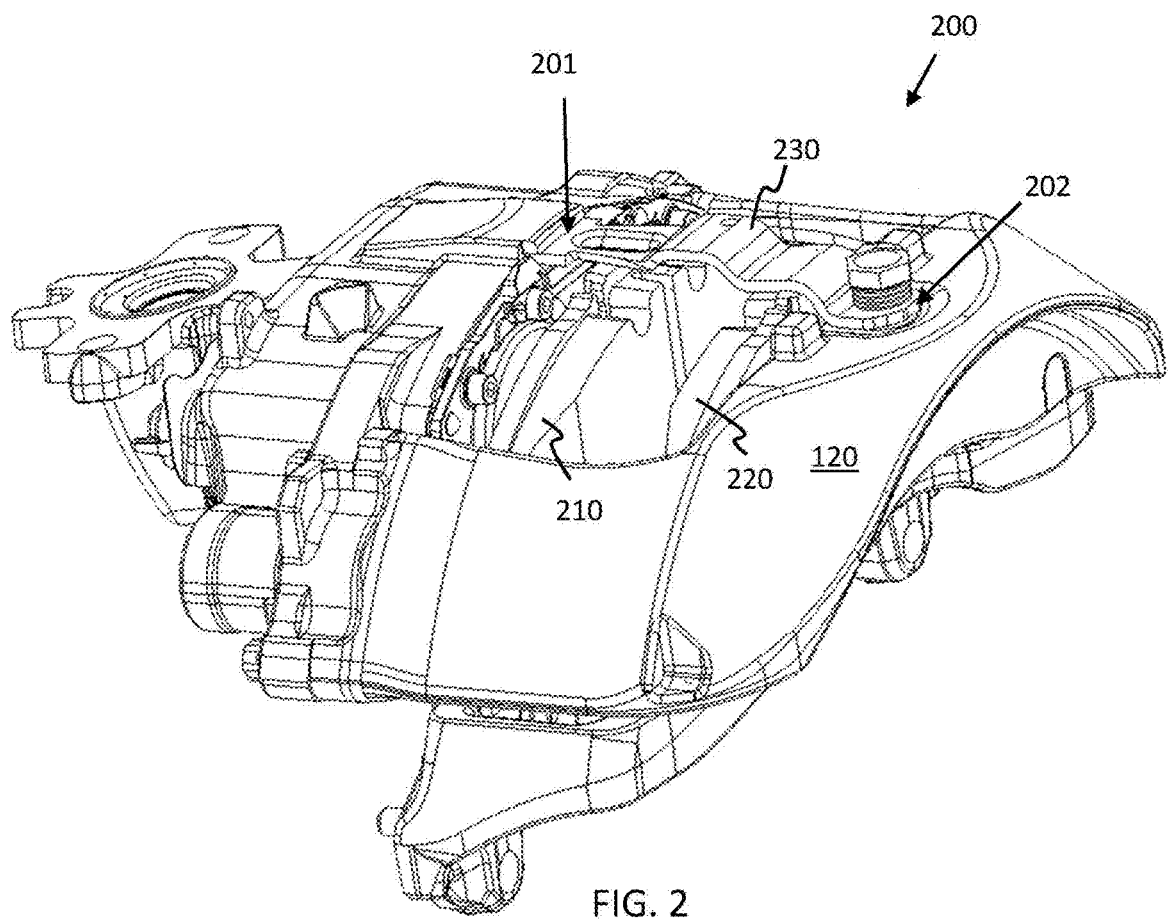
FIG. 2 shows an example disc brake.

FIG. 2 shows a disc brake which comprises a novel type of brake pad retainer arrangement 200. This brake pad retainer arrangement is able to robustly hold a brake pad in position relative to the disc 130 in the disc brake 120. Note that the disc 130 is not shown in FIG. 2. The arrangement comprises an elongated retainer bracket 230 arranged to extend transversely over the disc 130 and the brake pad 220. The elongated retainer bracket 230 may be a metal bracket having an approximately rectangular form. It is pivotably attached at one end 201 to the disc brake housing, allowing the other end 202 to move slightly.

The brake pad shown in the examples is an outer brake pad arranged on the wheel side of the disc brake. However, the concepts disclosed herein can be generalized in a straightforward manner to also be used for the inner brake pad, or for both the inner and the outer brake pad.

Figure 3:
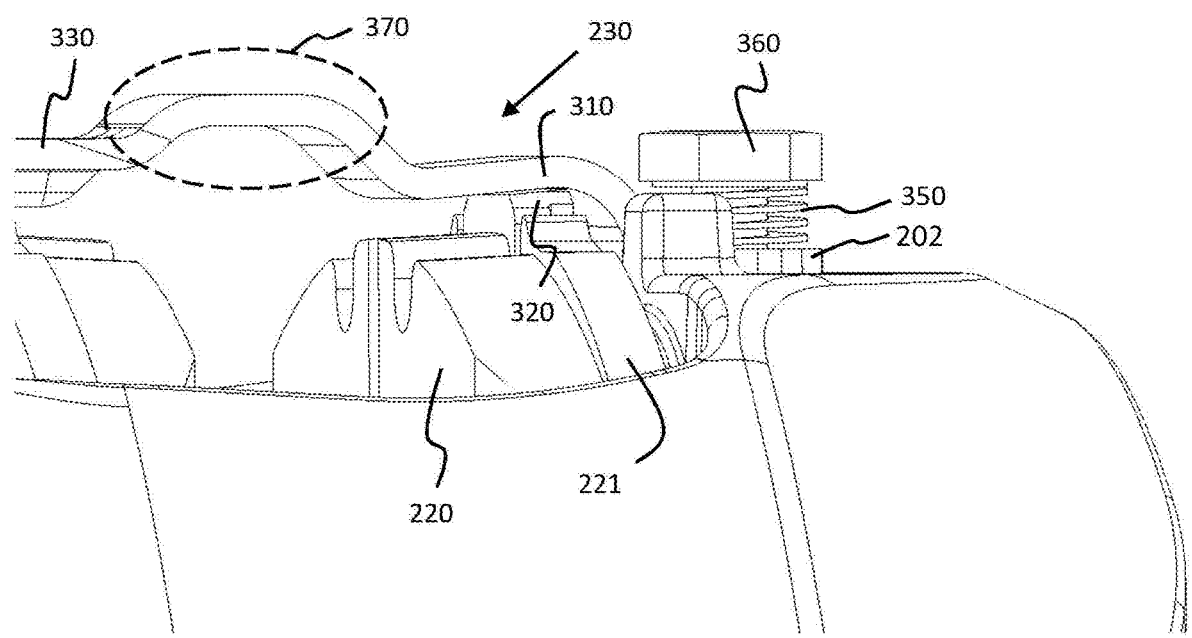
FIGS. 3-6 illustrate details of example disc brakes.
Figure 4:
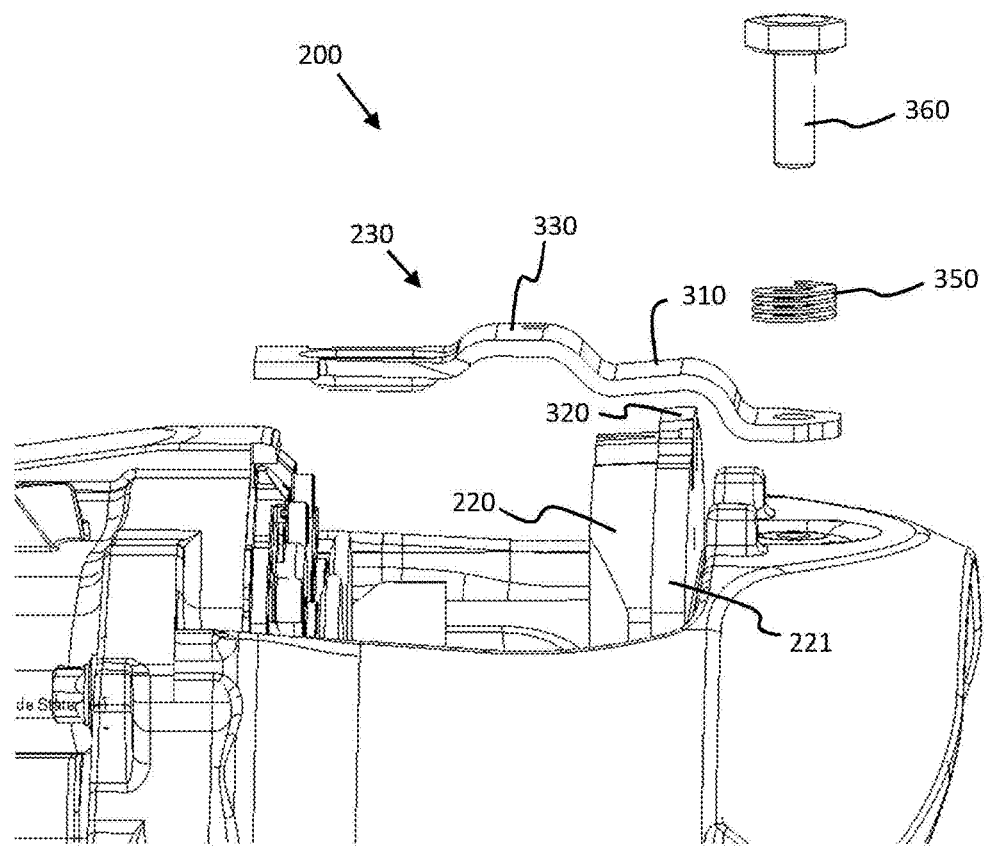

With reference also to FIG. 3 and FIG. 4, the retainer bracket 230 is spring loaded to press against a rim portion 320 of the brake pad 220. This means that the brake pad 220 is pressed into a brake pad carrier, and against, e.g., a brake pad carrier abutment (not shown in FIGS. 3 and 4). The retainer bracket 230 engages, i.e., presses against, the rim portion 320 of the brake pad. The rim portion 320 may be part of a back plate of the brake pad 220 as shown in FIG. 3. This spring loading contributes to reduced vibration by damping away at least part of the vibrations generated in the disc brake, which is an advantage.

Figure 5:
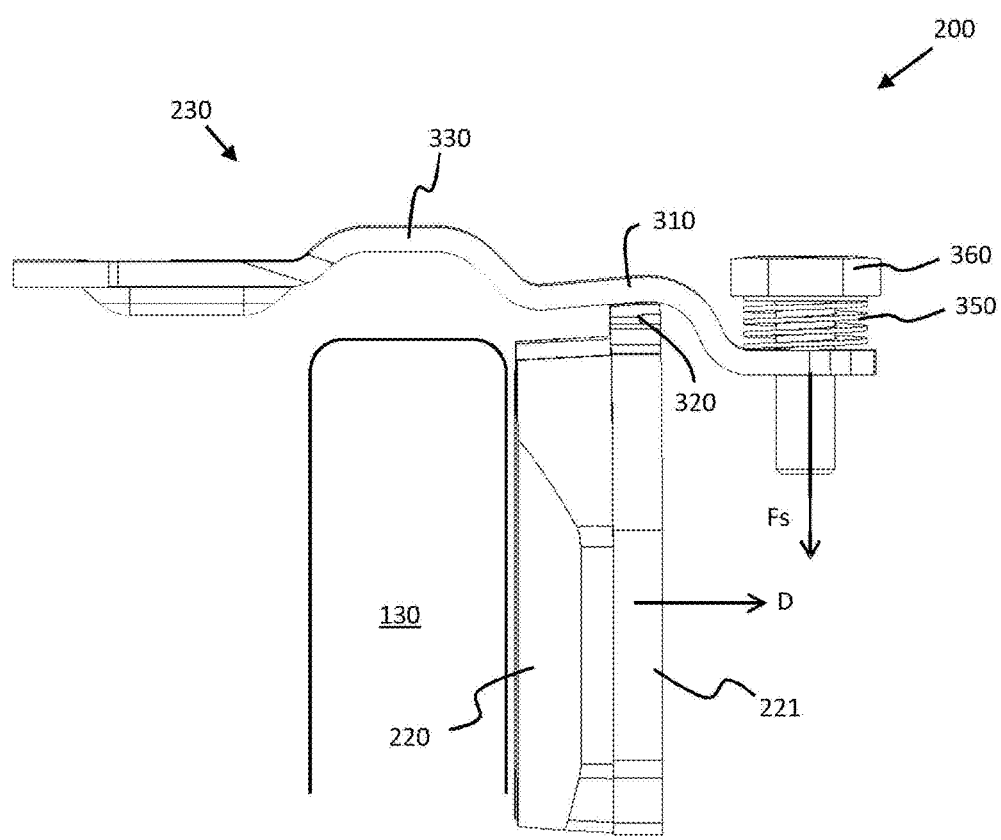
Figure 6:
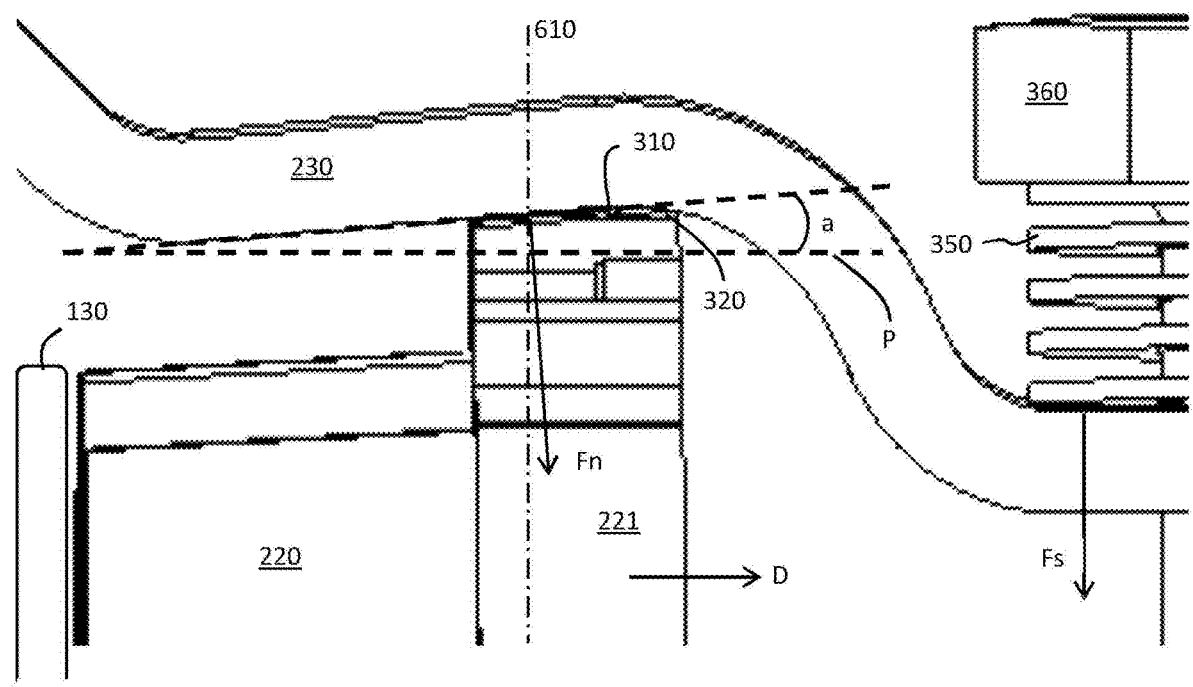

With reference to FIG. 5 and FIG. 6, the retainer bracket 230 is arranged to engage the rim portion 320 at an angle a, thereby biasing the brake pad 220 in a direction D away from the disc 130. The angle a is measured with respect to a plane P, indicated in FIG. 6, perpendicular to the spring loading force direction. The spring loading force direction is shown as Fs in FIG. 6. Due to the angle a, the normal force Fn comprises a component in direction D away from the disc 130, parallel to the plane P. This force component biases the brake pad and urges it to move away from the disc when the disc brake is not in use. Thus, parasitic drag and other drawbacks associated with unwanted contact between brake pad 220 and brake disc 130 are significantly reduced or removed entirely. The angle a is chosen depending on the overall disc brake design. I.e., on the required biasing force in direction D, on the overall friction between brake pad retainer 330 and brake pad rim portion 320. A suitable range of values for the angle a may be between 5-15 degrees, and preferably about 10 degrees.

The surfaces of the retainer bracket 310 and/or the rim portion 320 of the brake pad 220 may be treated with a low friction heat resistant material in order to reduce friction between the two and thereby increase the biasing force in direction D. Suitable low friction heat resistant materials include, e.g., Polytetrafluoroethylene (PTFE) which is a synthetic fluoropolymer of tetrafluoroethylenenylon often referred to as Teflon.

According to aspects, the rim portion 320 forms part of a back plate 221 of the brake pad 220. The retainer bracket 230 may comprises a tapered surface portion 310 configured to engage the rim portion 320 at the angle a. The tapering of the surface portion 310 is preferably matched to the tapering of the back-plate rim portion 320. Thus, a contact plane between the retainer bracket 230 and the rim portion 320 is angled at the angle a with respect to the plane P and the direction of the force D. Thus, the angle a is such as to force the brake pad away from the disc when the brake is not engaged.

Spring loading may efficiently be obtained by means of a helical spring 350. The helical spring 350 is arranged to load the retainer bracket 230 to press against the rim portion 320 of the brake pad 220.

The helical spring may rest against a housing of the disc brake 120 and may be held in position by a fastener 360 or set screw extending through one end of the retainer bracket 230 and into the disc brake housing. Thus, the retainer bracket 230 is pivotably or loosely attached to the disc brake housing at one end 201 and is held by the helical spring and set screw at the other end 202.

An advantage with the helical screw which is resting on the disc brake housing is that the spring loading force Fs can be accurately determined during a design phase, and also adjusted in the field by tightening and releasing the set screw 360.

The brake pads and the overall components of the disc brake may be somewhat sensitive to mechanical impact. Such mechanical impact may occur, e.g., during wheel servicing or replacement, when the wheel rim may fall onto the disc brake and cause damage. According to some aspects, with reference to FIG. 3, a middle portion 370 of the elongated retainer bracket 330 is formed to protrude from the disc brake 120 to shield the disc brake from mechanical impact. The retainer bracket forms a 'bulb' which absorbs impact from, e.g., the wheel rim or other objects, thereby protecting the disc brake 130 from damage.

There is also disclosed herein a brake pad 220 having a rim portion 320 configured with a tapered surface arranged to engage a brake pad retainer bracket at an angle a to bias the brake pad 220 in a direction D away from a disc 130 in a disc brake 120.

According to aspects, the rim portion 320 is a tapered extension attached to a back plate of the brake pad. This way existing legacy brake pads without the tapered rim portion can be adapted for use with the new retainer bracket 330.

According to aspects, the rim portion 320 is made of or covered by a low friction heat resistant material, such as Nylon, Polytetrafluoroethylene (PTFE) which is a synthetic fluoropolymer of tetrafluoroethylenenylon often referred to as Teflon, or other heat resistant low friction material.

The invention claimed is:

1. A brake pad retainer arrangement for holding a brake pad in position relative to a disc in a disc brake, the arrangement comprising:
   a rigid, elongated retainer bracket attached to a disc brake housing and arranged to extend transversely over the disc and the brake pad, the retainer bracket comprising a tapered surface portion configured to engage a tapered surface of a rim portion of the brake pad at an angle, thereby biasing the brake pad in a direction away from the disc, the tapered surface portion of the retainer bracket similarly angled to the tapered surface of the rim portion,
   a helical spring arranged to load the retainer bracket to press against the rim portion of the brake pad, and
   a fastener extending through a first end of the retainer bracket and into the disc brake housing to hold the helical spring in position.

2. The brake pad retainer arrangement of claim 1, wherein the angle is between 5-15 degrees.

3. The brake pad retainer arrangement of claim 1, wherein the rim portion forms part of a back plate of the brake pad.

4. The brake pad retainer arrangement of claim 1, wherein a middle portion of the elongated retainer bracket is formed to protrude from the disc brake to shield the disc brake from mechanical impact.

5. The brake pad retainer arrangement of claim 1, wherein the disc brake is a single piston disc brake, or a dual piston disc brake.

6. The brake pad retainer arrangement of claim 1, wherein the brake pad is an outer brake pad of the disc brake positioned at a wheel side of the disc brake.

7. A disc brake comprising the brake pad retainer arrangement of claim 1.

8. A vehicle comprising the brake pad retainer arrangement of claim 1.

9. The brake pad retainer arrangement of claim 1, wherein the fastener is a set screw configured to adjust the load of the helical spring on the retainer bracket.

* * * * *